Figure 1:
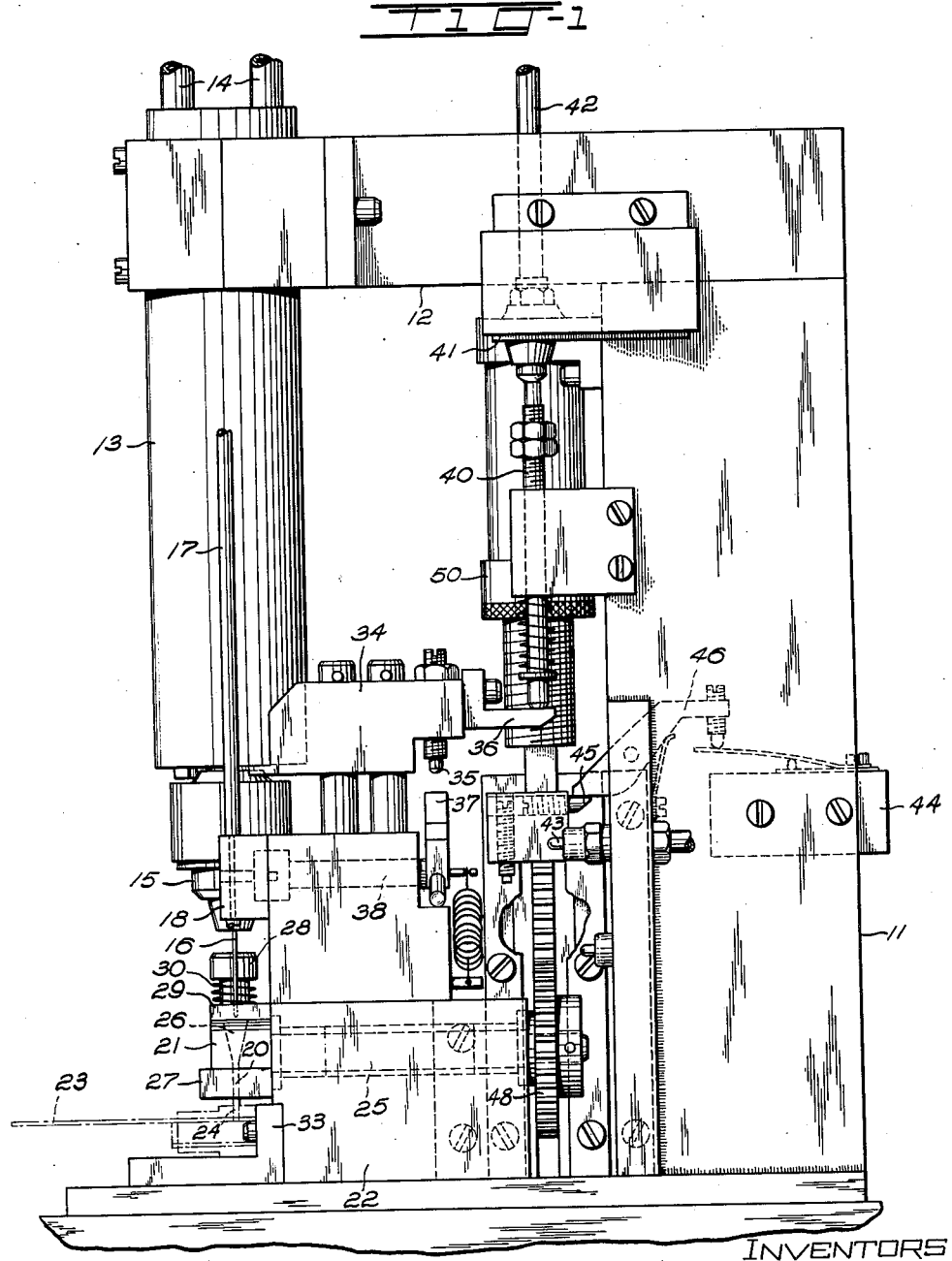

May 29, 1962  H. G. PAYNTON, JR., ETAL  3,036,309
PINNING FIXTURE

Filed March 7, 1960  2 Sheets-Sheet 1

INVENTORS
H.G. PAYNTON, JR.
E.J. WELCH

By L. Gundersen
ATTORNEY

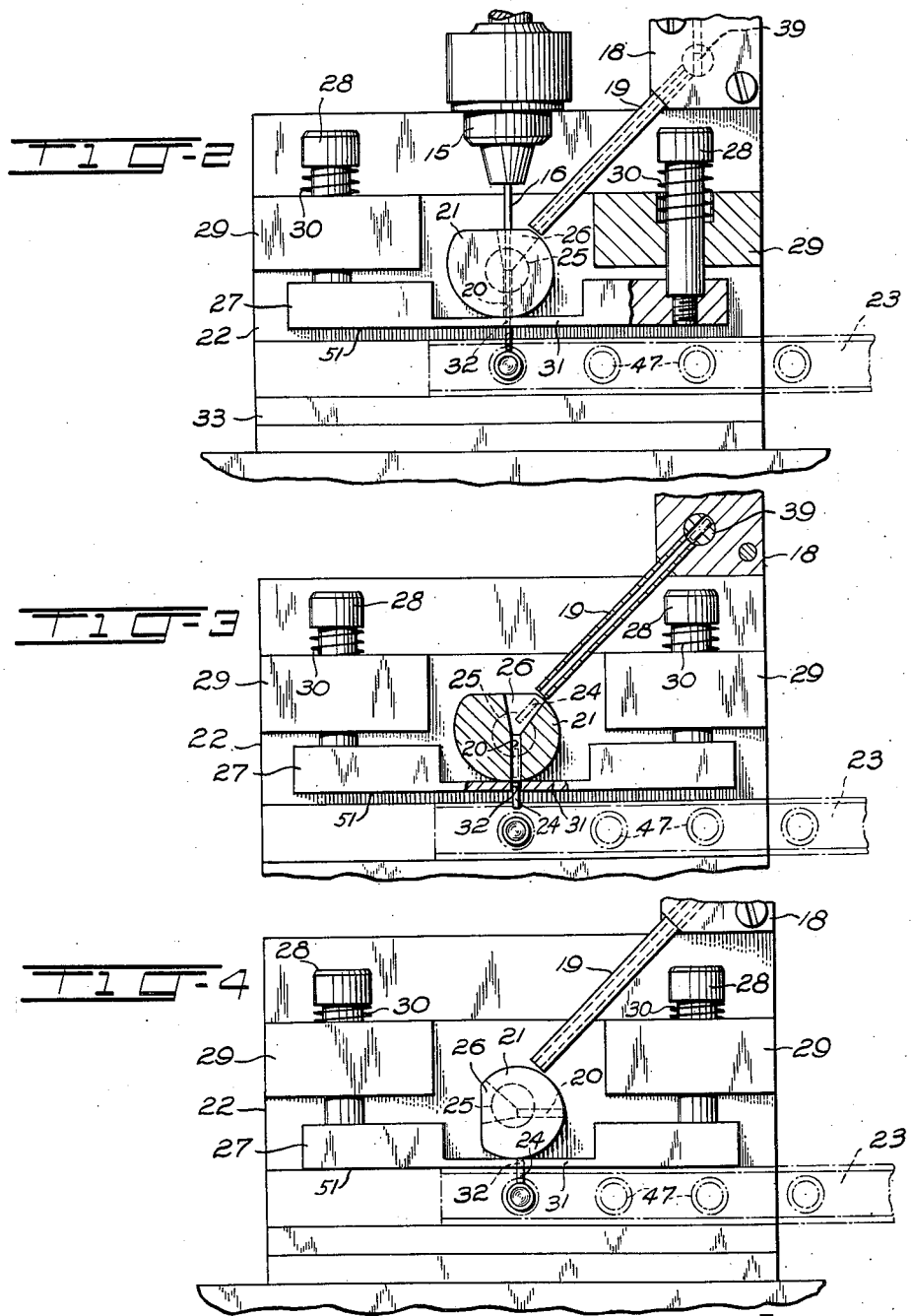

United States Patent Office 3,036,309
Patented May 29, 1962

3,036,309
PINNING FIXTURE
Harold G. Paynton, Jr., Cranford, and Edwin J. Welch, Highland Park, N.J., assignors to Western Electric Company, Incorporated, New York, N.Y., a corporation of New York
Filed Mar. 7, 1960, Ser. No. 13,202
7 Claims. (Cl. 1—302)

This invention relates to fabricating and assembling devices and particularly to apparatus for inserting elongated members, such as pins, into articles in a force fit.

The need frequently arises in manufacturing operations to secure the parts of an assembly in fixed relationship. A common expedient is to rely on a force or friction fit to achieve the fastening. In general, this involves forceably inserting an elongated element into a recess. The elongated element can be an extension of one of the members of the assembly and the recess a hole in another member, or the two members to be fastened together each having aligned holes into which a single pin is forced joining the members. The present invention may be applied to either of these types. Of course, there must be compatibility between the materials of the pin and hole in order that the cohesion between surfaces of the hole and intruding element should withstand the environment to which the assembly will be exposed.

Since the hole and the pin are necessarily closely dimensioned, the mass production of such assemblies inevitably involves indexing steps which are not only time consuming but which also require expensive, closely toleranced jigs. If the registering of the parts is to be accomplished mechanically, complex and expensive shifting and feeding apparatus are needed. In those cases where two or more parts are to be joined with a pin, these expenditures may be reduced by assembling the parts in their final relationship, and simultaneously drilling the undersized hole in both parts into which the pin is subsequently inserted. This technique requires at least two indexings: first, the assembled part must be indexed relative to the drill; second, the part must be indexed relative to the pin feeder and press which forces the pin into the hole.

An object of the invention is to provide a fixture adaptable to automation in which the drill, feed, and press steps can be accomplished with a minimum of workpiece and tool movement.

In accordance with this object, the invention in one embodiment utilizes a pin inserting fixture having a rotatable cam for pressing a pin, or similar elongated article, in a force fit into a workpiece. The cam has a passageway for receiving and passing a pin. Operable by the cam in a reciprocating movement toward and away from the workpiece is a cam follower which also has a passageway. This passageway is positioned to be in axial alignment with the cam passageway when the follower is in the extreme position of its movement away from the workpiece. The cam follower has a thickness adjacent its passageway of less than one pin length. The workpiece is so positioned relative to the cam and cam follower that a pin passed through the cam passageway into the follower passageway will be supported in the latter with one end on the workpiece. Subsequent rotation of the cam then forces the pin into the workpiece.

The above and other objects and embodiments of the invention will be understood from the following detailed description in connection with the drawings in which:

FIG. 1 is a side elevation partially in phantom of a drilling and pin inserting apparatus utilizing the invention, and FIGS. 2 through 4 are front elevations, partially broken, of a fixture according to the invention in three different stages of operation.

In FIG. 1, a drilling and pin insertion machine embodying the invention is shown. A frame 11 supports the several elements of the machine in proper relationship. Extending from supporting arm 12 is pneumatic air drill 13 having air supply lines 14. Drill chuck 15 is vertically reciprocable and holds drill 16.

Pin feed channel 17 feeds the pins in a steady stream from a suitable hopper or vibratory feeder, not shown, to the pin separator 18 which feeds pins individually in timed relation to the drilling operation through tube 19 (FIGS. 2 through 4) to a passage 26 in press cam 21.

Press cam 21 is part of the fixture designated generally by reference numeral 22, shown in greater detail in FIGS. 2 through 4, which permits the drilling, feeding, and pin inserting functions to be performed while a workpiece is in a single position. The fixture 22 includes the rotatable cam 21 having the passage 20 which provides a path for the drill 16 to the workpiece 23 and also permits passage of a pin 24, FIG. 3, from the feed tube 19 to the workpiece 23. Cam 21 is mounted on shaft 25 to rotate around a horizontal axis and passage 20 preferably passes through the center of rotation of the cam. Passage 20 in cam 21 is enlarged at its upper end in a funnel-like configuration 26 which permits the pin feed tube 19 to be angularly offset from the center line of passage 20 in order to provide clearance between the drill 16 and the feed tube 19. A cam follower 27 is supported for vertical reciprocation by floating lugs 28 which are held in frame blocks 29. Springs 30 held in compression between a lug cap and the block 29 provide the necessary force for biasing the cam follower 27 against the running surface of cam 21.

Cam follower 27 has a portion 31 of reduced cross section adjacent the surface making contact with the cam 21. This portion may be of hardened material as is, most favorably, the contact surface of the cam. Section 31 of cam follower 27 has a hole 32 which is in alignment with the cam passage 20 when the cam is in the position shown in FIGS. 2 and 3 so that a path then exists through the cam via passage 20, through the cam follower via passage 32, to the workpiece 23. Thus it is seen that the passageway in the cam follower is positioned therein to be in axial alignment with the passageway in the cam only when the cam follower is in the extreme position of its movement away from the workpiece. The workpiece 23 is supported on workpiece support 33 at a distance from the maximum radius of cam 21 such that a pin 24 is forced into the workpiece when the cam is in the position shown in FIG. 4. In order for this press action to occur, the pin must be supported over the hole during the press operation since the surface of the cam 21 contacts the end of pin 24 with a lateral movement which tends to misalign the pin and damage the hole. The reduced portion 31 of cam follower 27 serves to support the pin 24 during the press step. Consequently, the thickness of cam follower section 31 is determined by the amount of pin 24 which will remain protruding above the workpiece after the press operation and is, in any event, always less than the length of the pin. This dimension, of course, depends upon the particular requirements of the operation. In the operation shown, pins are to be successively fitted into adjacent shells as the workpiece is stepped from right to left. The workpiece may be positioned so that the lower surface of the cam follower 27 in its lowest position contacts the upper surface of workpiece 23 so that a pin passed through the cam passageway into the passageway in the follower will be supported in the latter with one end thereof bearing on the workpiece. After the cam has pressed a pin into the workpiece, the pin is left protruding above the workpiece an amount equaling the thickness of section 31. When the succeeding pin is installed, the protruding portion of the previously inserted pin is pressed flush with the work surface by portion 51 of the bottom surface of cam follower 27 which is displaced from cam follower hole 32 as shown in FIG. 4.

Timing of the several steps is an important consideration. It will be understood that the fixture 22 is adaptable to be used in numerous configurations in which the timing and the moving power for the different elements can have a variety of combinations. The embodiment of FIG. 1 is one of these which has proven satisfactory. The sequence of operation is controlled by a series of limit switches, time delay switches and poppet valves operated by traveling cams. Power is supplied by a pneumatic system. Drill chuck 15 has traveling with it movable arm 34 which holds adjustable cam levers 35 and 36. Cam 35 serves to turn rotating cam lever 37 which operates through shaft 38 to rotate a portion 39 of pin separator 18 so that with each cycle of drilling, one pin is fed from pin channel 17 to feed tube 19.

Cam 36 operates spring loaded cam follower 40 which in turn operates limit switch 41. Limit switch 41 controls a time delay unit, not shown, which after an appropriate delay to permit the pin to feed from pin selector 18 through tube 19 to cam 21, provides air pressure through tube 42 to an air motor 50 which moves gear rack 48 to eventually rotate cam 21 by means of shaft 25. At the lower end of its vertical travel cam follower 36 contacts poppet valve 43 which operates an air valve (not shown) reversing the direction of drill 16. Microswitch 44 is operated by cam 45 and cam follower 46 and serves to re-energize an electrical circuit (not shown) so that the cycle of operation may be started again by the operator.

The sequence of operation will be understood from FIGS. 2 through 4 in which FIG. 2 shows the workpiece 23 which consists, in this illustration, of a multiple jack strip of hard rubber material having conducting shells 47 inserted in holes in the strip. It is necessary to pin the shells to the hard rubber so that they cannot inadvertently by shifted in the holes. In the drilling step of FIG. 2 the drill 16 passes through the hole 20 in cam 21 and the hole 32 in cam follower 27 and drills through the hard rubber and the nickel-silver shell 47 of workpiece 23. The drill is then retracted from the workpiece and cam, then pin separator 39 rotates to place a single pin in feed tube 19. Pin 24 enters enlarged portion 26 of the passage in cam 21 and falls by gravity through holes 20 and 32 until it contacts the top of the hole drilled in part 23. At this point, as shown in FIG. 3, the pin is supported on its upper portion by section 31 of cam follower 27 over the hole in the workpiece 23. Cam 21 is then rotated forcing cam follower 27 down against the bias of springs 30. The working surface of cam 21 contacts the upper end of the pin 24 and forces it into the hole in the workpiece 23. The passageway 20 has been rotated during this step out of alignment with the hole 32.

Other uses of the invention will occur to those versed in the art. Numerous timing arrangements may be devised. Also, the invention may be utilized when an elongated element is forced into a material without there being a receiving hole. Too, the protruding portion of the pin may be cut off, riveted, or crimped, rather than driven flush, by suitable cutting, riveting, or crimping means which may be conveniently attached to the frame at a proper location above the portion of the workpiece including the previously inserted pins. Of course, such modification of the device would require that the portion of the bottom surface of the cam follower, which would normally abut the protruding portion of the previously inserted pin upon cam follower downstroke during the insertion of a subsequent pin, be eliminated. It is to be understood, therefore, that the above description is simply illustrative of the principles of the invention and is not intended to limit its application. Other arrangements may be devised which will embody the principles of the invention and still fall within its spirit and scope.

What is claimed is:

1. A pin inserting fixture which comprises a rotatable cam means for pressing a pin in a force fit into a workpiece, the cam means having a first passageway for receiving and passing a pin therethrough, a reciprocable cam follower operable by the cam means toward and away from the workpiece, the cam follower having a second passageway axially alignable with the first passageway for receiving the pin from the cam means and supporting the pin on the workpiece, the cam follower having a thickness adjacent the second passageway of less than one pin length, the first and second passageways being in alignment only when the cam follower is at an extreme position of its movement away from the workpiece, so that a pin passes through the first and into the second passageway when the cam follower is at the extreme position of its movement and is supported by the cam follower and the workpiece, subsequent rotation of the cam means presses the pin into the workpiece.

2. In a pin setting fixture for assembling pins held frictionally in a workpiece having rotatable cam means for vertically displacing a cam follower and pressing a pin into the workpiece, a cam follower vertically displaceable by the cam means, and a workpiece supporting means for holding the workpiece beneath the cam follower, the improvement in which the cam means has a passage minimally dimensioned for at least a portion of its length to pass individual pins therethrough, the passage being vertically oriented when the cam follower is at the top of its stroke and angularly displaced from the vertical when the cam follower is removed from the top of its stroke, the cam follower has a vertically oriented passage in alignment with the cam means passage when the follower is at the top of its stroke, and the workpiece supporting means is positioned to provide a spacing when the cam follower is at the top of its stroke of approximately one pin length between the top of a workpiece and the top of the cam follower, whereby a single pin fed through the cam means and cam follower passages when the follower is at the top of its stroke, is supported on the workpiece by the follower, and is then pressed into the workpiece by rotation of the cam means.

3. A fixture according to claim 1, in which the upper portion of the cam means passage is widened in a fan-shaped configuration to provide vertical and angularly displaced access to the cam means passage when the follower is at the top of its stroke, and the center line of the narrow portion of the cam passage passes through the axis of rotation of the cam means.

4. A pin inserting fixture which comprises in combination, rotatable cam means for reciprocating a pin support and pressing a pin into a workpiece, vertically reciprocable pin supporting means for supporting a pin in alignment with a mating hole in a workpiece, and a workpiece supporting means for positioning a workpiece in spaced relation to the pin supporting means, the cam means and pin supporting means each having a pin passage therethrough which are in vertical alignment only when the supporting means is at the top of its stroke, the workpiece supporting means being arranged in spaced relation to the pin supporting means to provide at least one pin length between the top of a workpiece and the top of the supporting means at the top of its stroke, less than one pin length between the top of a workpiece and the top of the supporting means at the bottom of its stroke, and less than one pin length between the top of the workpiece and the bottom of the supporting means pin passage at the top of its stroke.

5. A fixture according to claim 4 in which the upper portion of the cam means passage is widened toward the top in one plane in a fan-shaped arrangement.

6. In a machine for drilling and inserting pins in a workpiece, having press means and a drill operatively connected thereto, said press means including a rotatable cam for forcing pins into a workpiece, pin support means for holding individual pins in correct position for forcing into the workpece, and pin source means for supplying individual pins to the support means, the improvement in which the cam contains a guideway to permit access of the drill to the pin support means and to direct a pin from the source means to the support means when the cam is in a nonforcing position, and the cam is arranged so that rotation displaces the guideway from the support means providing a cam bearing surface which applies an axial force to one end of a pin held by the supporting means.

7. A machine according to claim 6 in which the source means is angularly removed from the center line of the drill, and the guideway is enlarged in the portion adjacent the source means.

No references cited.